(12) United States Patent
Muramatsu

(10) Patent No.: US 7,889,438 B2
(45) Date of Patent: Feb. 15, 2011

(54) LARGE-APERTURE ZOOM LENS

(75) Inventor: Yuichi Muramatsu, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 12/662,902

(22) Filed: May 11, 2010

(65) Prior Publication Data
US 2010/0290131 A1 Nov. 18, 2010

(30) Foreign Application Priority Data
May 12, 2009 (JP) .............................. 2009-115682

(51) Int. Cl.
*G02B 15/14* (2006.01)
*G02B 27/64* (2006.01)
(52) U.S. Cl. ...................... 359/687; 359/557
(58) Field of Classification Search ................ 359/683, 359/687, 554, 557
See application file for complete search history.

(56) References Cited

U.S. PATENT DOCUMENTS

| 6,473,231 | B2 * | 10/2002 | Hamano et al. ............. 359/557 |
| 7,253,965 | B2 | 8/2007 | Shibayama et al. |
| 2009/0290216 | A1 * | 11/2009 | Fujisaki ...................... 359/557 |

FOREIGN PATENT DOCUMENTS

| JP | 2006106191 A | 4/2006 |
| JP | 2006234892 A | 9/2006 |
| JP | 2006284763 A | 10/2006 |
| JP | 2007093773 A | 4/2007 |
| JP | 2007133138 A | 5/2007 |

\* cited by examiner

*Primary Examiner*—Scott J Sugarman
(74) *Attorney, Agent, or Firm*—Jacobson Holman PLLC

(57) ABSTRACT

The invention is directed to a large-aperture zoom lens that provides an aperture ratio as small as 2.8 as strongly desired, facilitates implementation with a vibration compensating mechanism, and successfully downsizes in more compact lens. The large-aperture zoom lens has four of groups of lens pieces, that is, the leading or foremost 1st lens group of positive refractivity, the succeeding 2nd lens group of negative refractivity, the 3rd lens group of positive refractivity, and the trailing 4th lens group of positive refractivity, and as the zoom lens varies power from the wide-angle end to the telephoto end, the 1st and 2nd lens groups split farther away from each other, the 2nd and 3rd lens groups come closer to each other, and the 3rd and 4th lens groups come closer to each other. The 3rd lens group includes the leading subset of the lens pieces of positive refractive power located closer to an object and the trailing subset of negative refractive power, and in order to compensate for tremors of user's hand(s) and vibrations of a camera and adjust an image formed, the trailing subset of the 3rd lens group alone are displaced in directions perpendicular to the optical axis. The 4th lens group has its foremost lens piece shaped in concave lens on a surface closer to the object.

5 Claims, 14 Drawing Sheets

LARGE-APERTURE ZOOM LENS

FIELD OF THE INVENTION

The present invention relates to a large-aperture zoom lens, and more particularly, to a large-aperture zoom lens that provides a field angle greater than 80 degrees at the wide-angle end, that is approximately 2.8 in aperture ratio throughout the entire zoom range, that facilitates implementation with a vibration compensating mechanism therein and attains a reduced degradation of the adjusted image resulted from vibration compensation, and that is approximately 2.8 in variable power.

BACKGROUND ART

A development of optical design and optical component manufacturing technologies over decades has enabled downsizing of zoom lenses of which aperture ratio is still kept as low as 2.8. Specifically, there have been developed a type of zoom lenses having four of lens groups; that is, the leading or foremost 1st group of lens pieces of positive refractive power, the succeeding 2nd group of lens pieces of negative refractive power, the 3rd group of lens pieces of positive refractive power, and the trailing or rearmost 4th group of lens pieces of positive refractive power (e.g., see Patent Document 1 listed below).

Another type of compact zoom lenses developed so far are compatible with digital cameras that are typically provided with an imaging device generally referred to as APS-C imaging sensor and dimensioned roughly six tenth as large as 35 mm format, which also has four lens groups; that is, the leading or foremost 1st group of lens pieces of positive refractivity, the succeeding 2nd group of lens pieces of negative refractivity, the 3rd group of lens pieces of positive refractivity, and the trailing or rearmost 4th group of lens pieces of positive refractivity where at least the 1st, 3rd and 4th lens groups among all are simply displaced toward an object along the optical axis so that the 1st and 2nd lens groups at the telephoto end are split farther away from each other than they are at the wide-angle end while the 2nd and 3rd lens groups at the telephoto end come closer to each other (e.g., see Patent Document 2 listed below). Such zoom lenses satisfy conditions as depicted in the formula as follows:

$$4.0 < f1/fw < 7.0$$

$$2.0 < f3/fw < 5.0$$

where i is an ordinal number used to show in which position the lens groups are arranged one after another from the object to the imaging plane, fi is a focal length of the i-th lens group, and fw is the focal length of the whole optical system at the wide-angle end, and the zoom lenses are 3.42 in zoom ratio and range approximately from 4.1 to 5.9 in aperture ratio.

In addition, still another type of the compact zoom lenses with the vibration compensating mechanism have been developed, which provide a long back focus suitable to digital single-lens reflex cameras, are as great as ×10 in zoom ratio, and provides a field angle of 70 degrees or even wider at the wide-angle end (e.g., see Patent Document 3 listed below). Such zoom lenses, which comprise the leading or foremost 1st lens group G1 of positive refractivity, the succeeding 2nd lens group G2 of negative refractivity, the 3rd lens group G3 of positive refractivity, and the trailing 4th lens group G4 of positive refractivity, vary power by altering a distance between the adjacent ones of the lens groups. The 3rd lens group G3 has the leading subset G3F of the lens pieces of positive refractive power located closer to the object and the trailing subset G3R of the lens pieces of negative refractive power, and the trailing subset G3R alone are displaced in directions perpendicular to the optical axis to compensate for deviation of the resultant image formed in the plane. At least one major surface of any of the lens pieces in the trailing subset G3R is aspherical so that its positive refractive power is enhanced or its negative refractive power is diminished as it is farther apart from the optical axis toward the periphery in comparison with a spherical surface curved with a radius of paraxial curvature where such an aspherical surface is shaped, meeting requirements defined in predetermined conditional formula.

Similarly, there have been disclosed a similar type of the zoom lenses with the vibration compensating mechanism, which provide a long back focus applicable to digital single-lens reflex cameras as well, vary aperture ratio from 3.52 at the wide-angle end to 5.08 at the intermediate zoom range and further to 5.88 at the telephoto end, and provide a field angle of 70 degrees or even greater at the wide-angle end (e.g., see Patent Document 4). Such zoom lenses, which have four of the lens groups including the leading or foremost 1st lens group G1 of positive refractivity located closer to the object, the succeeding 2nd lens group G2 of negative refractivity, the 3rd lens group G3 of positive refractivity, and the trailing 4th lens group G4 of positive refractivity, have the 1st and 2nd lens groups G1,G2 split farther away from each other, have the 2nd and 3rd lens groups G2, G3 come closer to each other, and the 3rd and 4th lens groups G3, G4 do not stay at a fixed distance from each other as the zoom lenses vary power from the wide-angle end to the telephoto end. The 3rd lens group G3 has the leading subset G31 of the lens pieces of positive refractive power closer to the object and the trailing subset G32 of the lens pieces of negative refractive power, and the trailing subset G32 alone are displaced in directions perpendicular to the optical axis to compensate for the undesirably deviated image plane due to vibrations by tremors of the user's hand(s) so as to meet conditions as expressed in predetermined formula.

Another similar type of the zoom lenses with the vibration compensating mechanism have been disclosed, which additionally have an anti-vibration mechanism functioning to form an adjusted image as a result of vibration compensation (e.g., see Patent Document 5). Such zoom lenses have the leading lens group L1 of positive refractivity located closer to the object and the remaining lens groups succeeding to the same as well as the trailing or rearmost lens group L4 of negative refractivity behind the aperture stop SP closer to the imaging plane, which are all varied in distance between the adjacent ones of the lens groups during the zooming. The lens group L4 is comprised of two lens components of negative refractive power one of which closer to the aperture stop SP is displaced in directions perpendicular to the optical axis to alter a position where the image is to be formed.

Such zoom lenses meet requirements for lens optics as bright as 2.8 in aperture ratio suitable for the state-of-the-art digital camera zoom lenses, which contemplate renovated features in view of anti-vibration and anti-blur as well as of widening a variety of pictorial representations, allowing for a reduced depth of focus of such bright lens optics with a reduced aperture ratio that is suitable for the pictorial representation like portrait.

LIST OF PRIOR ART DOCUMENTS

Patent Document 1

Japanese Preliminary Publication of Unexamined Patent Application No. 2007-133138

Patent Document 2

Japanese Preliminary Publication of Unexamined Patent Application No. 2007-93773

Patent Document 3

Japanese Preliminary Publication of Unexamined Patent Application No. 2006-284763

Patent Document 4

Japanese Preliminary Publication of Unexamined Patent Application No. 2006-106191

Patent Document 5

Japanese Preliminary Publication of Unexamined Patent Application No. 2006-234892

As has been described in the above, since the bright lens optics with the reduced aperture ratio provides the reduced depth of focus, it is suitable for the pictorial representation such as portrait, and in the light of this, the bright lens optics has been prevailing as consumer products in the market with a production concept that a deteriorated resolution of an image affected by tremors of a hand(s) of camera users can be less significant by designing the lens optics of the reduced focal length. However, the state-of-the-art digital single-lens reflex cameras has a considerably increased number of pixels of an imaging device such as CCD or the like, and this enables high-resolution pictures in photo-shooting. This brings about sharpening a perception of the camera users who become more aware of even a slight deterioration of the resolution in the formed image although they feel it not so conspicuous so long as using earlier generations of cameras of poorer resolution. Hence, when it is desired to validate the full potential resolution of the state-of-the-art high-resolution digital single-lens reflex camera, it is required to avoid influences of user's hand tremors and camera vibrations much more than the prior art standards.

The zoom lens providing a focal length as short as of the wide-angle to standard ranges as set forth in Patent Document 1 is so small an aperture ratio as 2.8, but there are no contemplation and suggestion of incorporating with any type of the anti-vibration mechanism.

The compact zoom lens compatible with the digital single-reflex cameras as disclosed in Patent Document 2 is dark, having so large an aperture ratio as 4 at the wide-angle end and 6 at the telephoto end, and this results in the increased adverse effects of tremors of user's hand(s) and vibrations of the camera. There are no contemplation and suggestion of incorporating with the vibration compensating mechanism.

Disclosures in Patent Documents 3 and 4 are directed to the zoom lenses with the vibration compensating mechanism, which are commonly dark, having so large an aperture ratio as approximately 3.5 at the wide-angle end and approximately 5.8 at the telephoto end, and this is far behind the strongly desired aperture ratio as small as 2.8.

Patent Document 5 discloses the zoom lens with the vibration compensating mechanism that provide a small aperture ratio of on the order of 2.8 and a focal length as short as of the wide-angle to standard ranges, and that has five of the groups of lens pieces in the lens optics where they assume a combination of refractivity attributes of positive-negative-positive-negative-positive in this order. Since such a zoom lens varies power by varying a distance between the adjacent ones of the lens groups for the purpose of altering magnification of each lens group, the disclosed invention where four pairs of the adjacent lens groups are displaced to accordingly vary four of the distances therebetween during the zooming thus has so many lens groups dedicated to vary the distances between them and then to vary power of the zoom lens, as a whole, resulting in so little an amount of each distance being varied. Thus, a displacement of each of the lens groups can be reduced, which permits a lens barrel to house such lens groups to be configured in a simplified and weight-reduced manner. With such a four-plus-one arrangement, the entire extension of the lens optics is longer than that of the four-lens-group configuration, and hence, the lens piece closest to the object transmits abaxial rays at radially outer points away from the optical axis, which necessitates the lens piece to have a greater aperture to ensure as much quantity of peripheral light, resulting in difficulties in implementing a compact zoom lens as desired.

The present invention is made to overcome the aforementioned disadvantages that the prior art embodiments of the zoom lenses provide insufficiently small aperture ratio, uncertainty to incorporate with any type of the vibration compensating mechanism, and/or, inability to downsize, and accordingly, it is an object of the present invention to provide a compact large-aperture zoom lens that is as small as 2.8 in aperture ration as strongly desired in the industry and is capable of facilitating implementation with a vibration compensating mechanism.

SUMMARY OF THE INVENTION

In a first aspect of the present invention, a large-aperture zoom lens has four of groups of lens pieces, that is, the leading or foremost 1st lens group of positive refractivity, the succeeding 2nd lens group of negative refractivity, the 3rd lens group of positive refractivity, and the trailing 4th lens group of positive refractivity, and as the zoom lens varies power from the wide-angle end to the telephoto end, the 1st and 2nd lens groups split farther away from each other, the 2nd and 3rd lens groups come closer to each other, and the 3rd and 4th lens groups come closer to each other.

In such a zoom lens, the 3rd lens group includes the leading subset of the lens pieces of positive refractive power located closer to an object and the trailing subset of negative refractive power, and in order to compensate for tremors of user's hand(s) and vibrations of a camera and adjust an image formed, the trailing subset of the 3rd lens group alone are displaced in directions perpendicular to the optical axis. The 4th lens group has its foremost lens piece shaped in concave lens on a surface closer to the object.

In another aspect of the present invention, a large-aperture zoom lens has four of groups of lens pieces, that is, the leading or foremost 1st lens group of positive refractivity, the succeeding 2nd lens group of negative refractivity, the 3rd lens group of positive refractivity, and the trailing 4th lens group of positive refractivity, and as the zoom lens varies power from the wide-angle end to the telephoto end, the 1st and 2nd lens groups split farther away from each other, the 2nd and 3rd lens groups come closer to each other, and the 3rd and 4th lens groups come closer to each other.

In such a zoom lens, the 3rd lens group includes the leading subset of the lens pieces of positive refractive power located closer to an object and the trailing subset of negative refractive power, and in order to compensate for tremors of user's hand(s) and vibrations of the camera and adjust an image formed, the trailing subset of the 3rd lens group alone are displaced in directions perpendicular to the optical axis. The large-aperture zoom lens meets requirements as expressed in the following conditional formula:

$$1.6 \leq f3/fw \leq 2.4 \quad (1)$$

$$2.0 \leq f4/fw \leq 2.4 \quad (2)$$

where fw is a focal length of the entire lens optics at the wide-angle end, f3 is the focal length of the 3rd lens group, and f4 is the focal length of the 4th lens group.

In a third aspect of the present invention, a large-aperture zoom lens has four of groups of lens pieces, that is, the leading or foremost 1st lens group of positive refractivity, the succeeding 2nd lens group of negative refractivity, the 3rd lens group of positive refractivity, and the trailing 4th lens group of positive refractivity, and as the zoom lens varies power from the wide-angle end to the telephoto end, the 1st and 2nd lens groups split farther away from each other, the 2nd and 3rd lens groups come closer to each other, and the 3rd and 4th lens groups come closer to each other.

In such a zoom lens, the 3rd lens group includes the leading subset of the lens pieces of positive refractive power located closer to an object and the trailing subset of negative refractive power, and in order to compensate for tremors of user's hand(s) and vibrations of a camera and adjust an image formed, the trailing subset of the 3rd lens group alone are displaced in directions perpendicular to the optical axis.

The 4th lens group has its foremost lens piece shaped in concave lens on a surface closer to the object.

The large-aperture zoom lens meets requirements as expressed in the conditional formula as follows:

$$2.0 \leq f4/fw \leq 2.4 \quad (2)$$

where fw is a focal length of the entire lens optics at the wide-angle end, and f4 is the focal length of the 4th lens group.

The large-aperture zoom lens in accordance with the first and second aspect of the present invention as defined in appended Claim 1 and Claim 2 meets requirements as expressed in the following conditional formula:

$$1.6 \leq BFW/fw \leq 2.4 \quad (3)$$

where BFW is a back focus at the wide-angle end.

<Description of the Conditional Formulae Referenced in Terms of the Invention>

The formula (1) defines a rate of the focal length of the zoom lens at the wide-angle end to the focal length of the 3rd lens group. If the rate exceeds the lower limit as defined in the formula (1), the 3rd lens group has its focal length reduced, resulting in advantageously ensuring so much a desired quantity of peripheral light, but this brings about difficulties in compensating for spherical aberration and comatic aberration and in ensuring a sufficient back focus. If the rate exceeds the upper limit as defined in the formula (1), the 3rd lens group has its focal length increased, resulting in a difficulty in ensuring the desired quantity of peripheral light.

Refining the formula (1) as in $2.0 \leq f3/fw \leq 2.3$ enables effects of the invention to work more assuredly.

The formula (2) defines a rate of the focal length of the zoom lens at the wide-angle end to that of the 4th lens group. If the rate exceeds the lower limit as defined in the formula (2), the 4th lens group has its focal length reduced, resulting in advantageously ensuring the back focus, but this brings about a difficulty in compensating especially for curvature of field. If the rate exceeds the upper limit as defined in the formula (2), the 4th lens group has its focal length increased, resulting in a difficulty in ensuring the back focus as desired.

Refining the formula (2) as in $2.1 \leq f4/fw \leq 2.3$ enables the invention to be implemented more effectively.

The formula (3) defines a rate of the focal length of the zoom lens at the wide-angle end to the back focus. If the rate exceeds the lower limit as defined in the formula (3), the zoom lens has its back focus reduced, resulting in the back focus becoming shorter than required to avoid interference of the zoom lens with optical components such as mirrors within a single-lens reflex camera to which the zoom lens is attached. If the rate exceeds the upper limit as defined in the formula (3), the zoom lens has its back focus increased, resulting in the zoom lens being able to be attached to the single-lens reflex camera without interference with its component mirrors, but the increased back focus causes a distance from the front end surface of the lens closer to the object to the image plane to accordingly as much extend, which resultantly leads to the lens optics having a greater entire length to accordingly have an increase in dimensions of the zoom lens. If the 4th lens group has its focal length reduced so as not to exceed the lower limit as defined in the formula (3), there arises a difficulty in compensating for curvature of field.

Refining the formula (3) as in $1.8 \leq BFW/fw \leq 2.3$ ensures effects of the invention.

Thus, the large-aperture zoom lens according to the present invention attains aperture ratio as small as 2.8 as strongly desired, facilitates implementation with a vibration compensating mechanism, and successfully downsizes in more compact lens.

DETAILED DESCRIPTION OF THE INVENTION

Best Mode of the Invention

Figure 1:
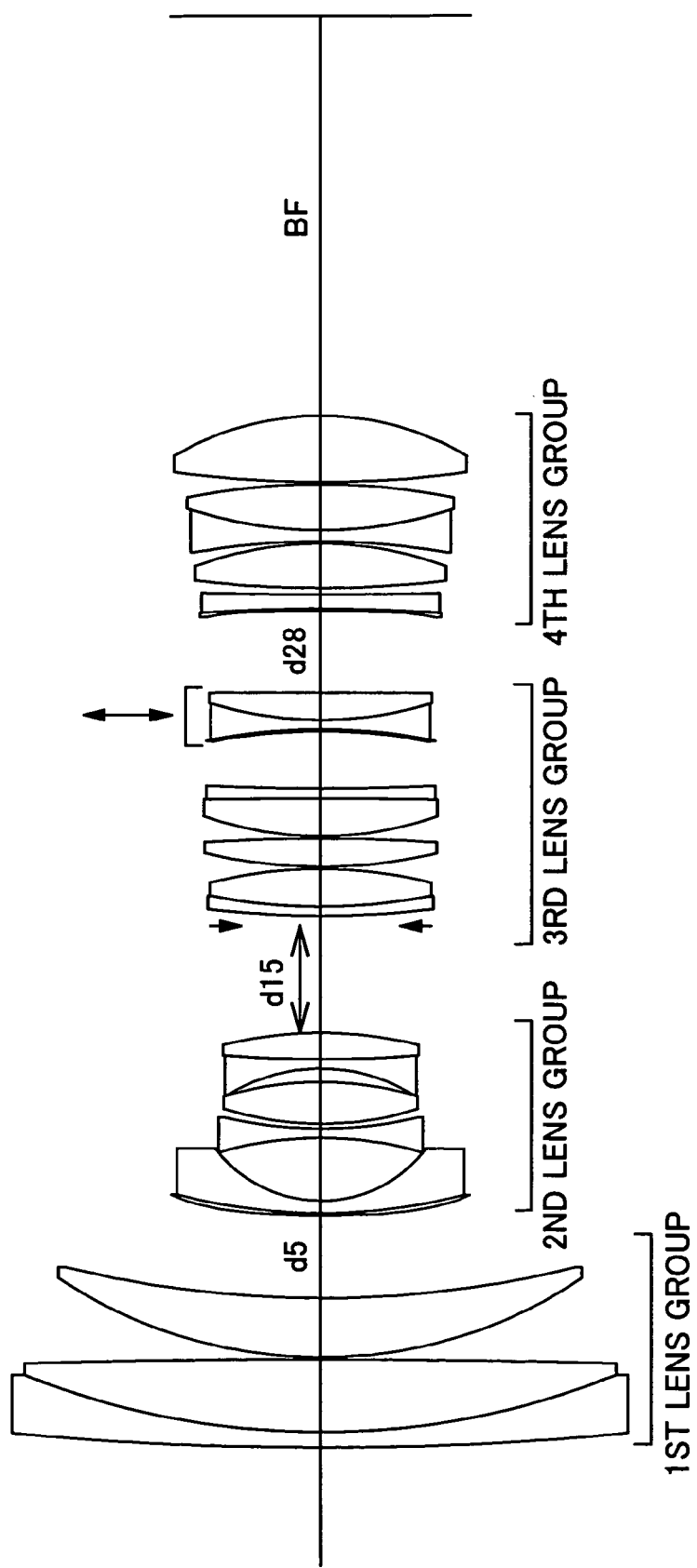
FIG. 1 is a diagram illustrating an arrangement of optics of a first embodiment of a large-aperture zoom lens.
Figure 2:
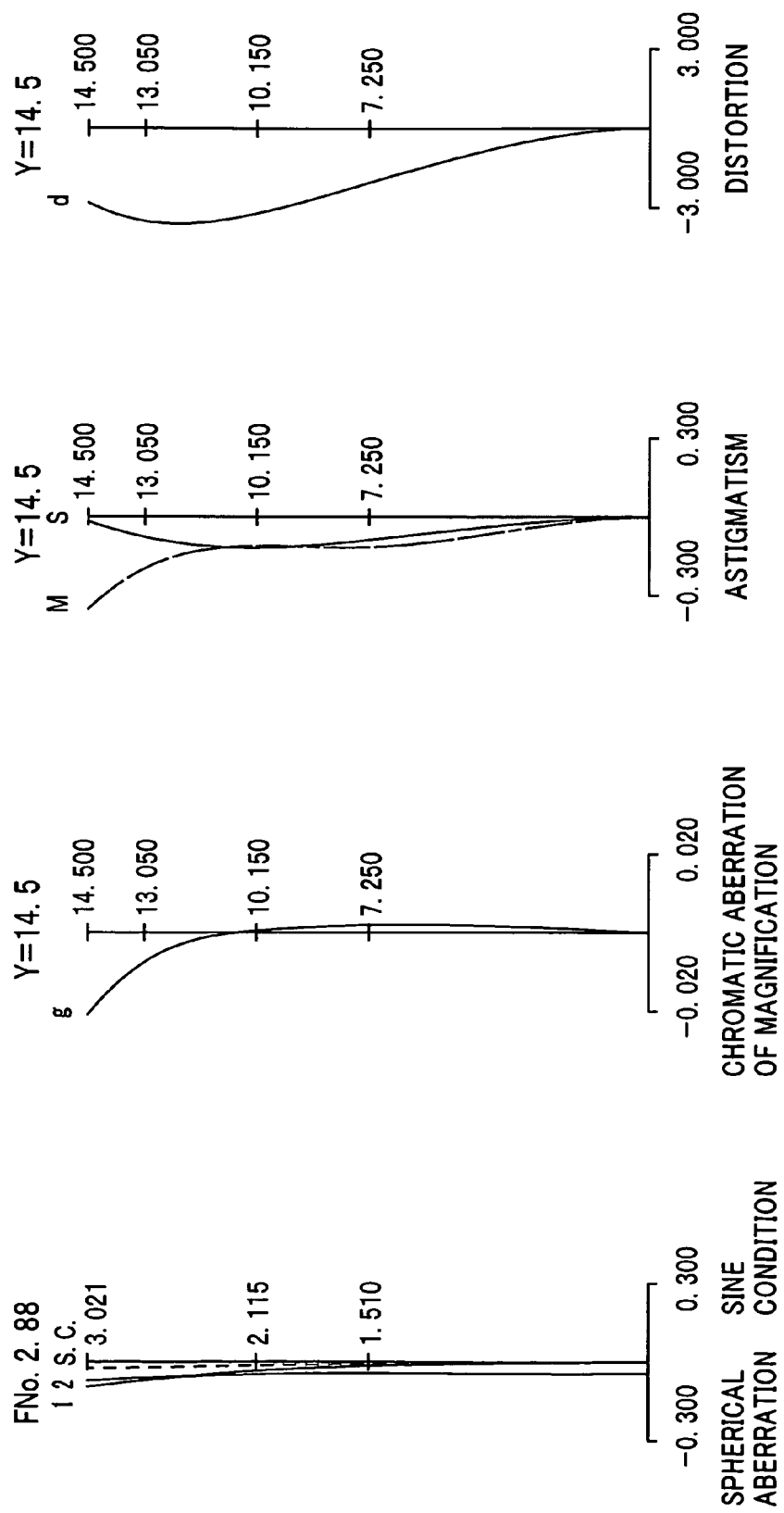
FIG. 2 is a diagram illustrating spherical aberration, sine conditions, chromatic aberration of magnification, astigmatism, and aberration of distortion caused in the exemplary large-aperture zoom lens in FIG. 1 at the wide-angle end.
Figure 3:
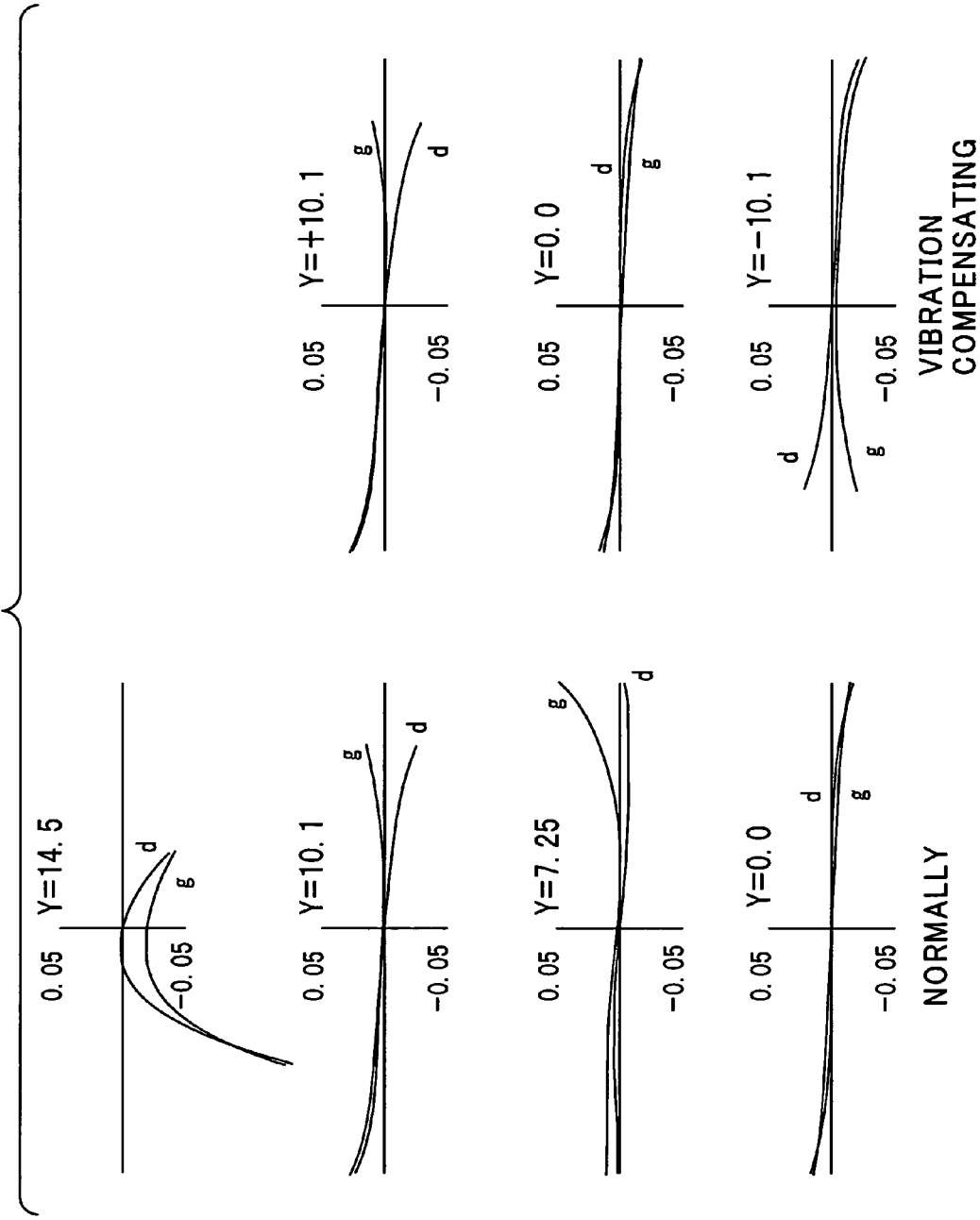
FIG. 3 is a diagram illustrating comatic aberration caused in the exemplary large-aperture zoom lens in FIG. 1 at the wide-angle end, set in a normal mode and an anti-vibration mode, respectively.
Figure 4:
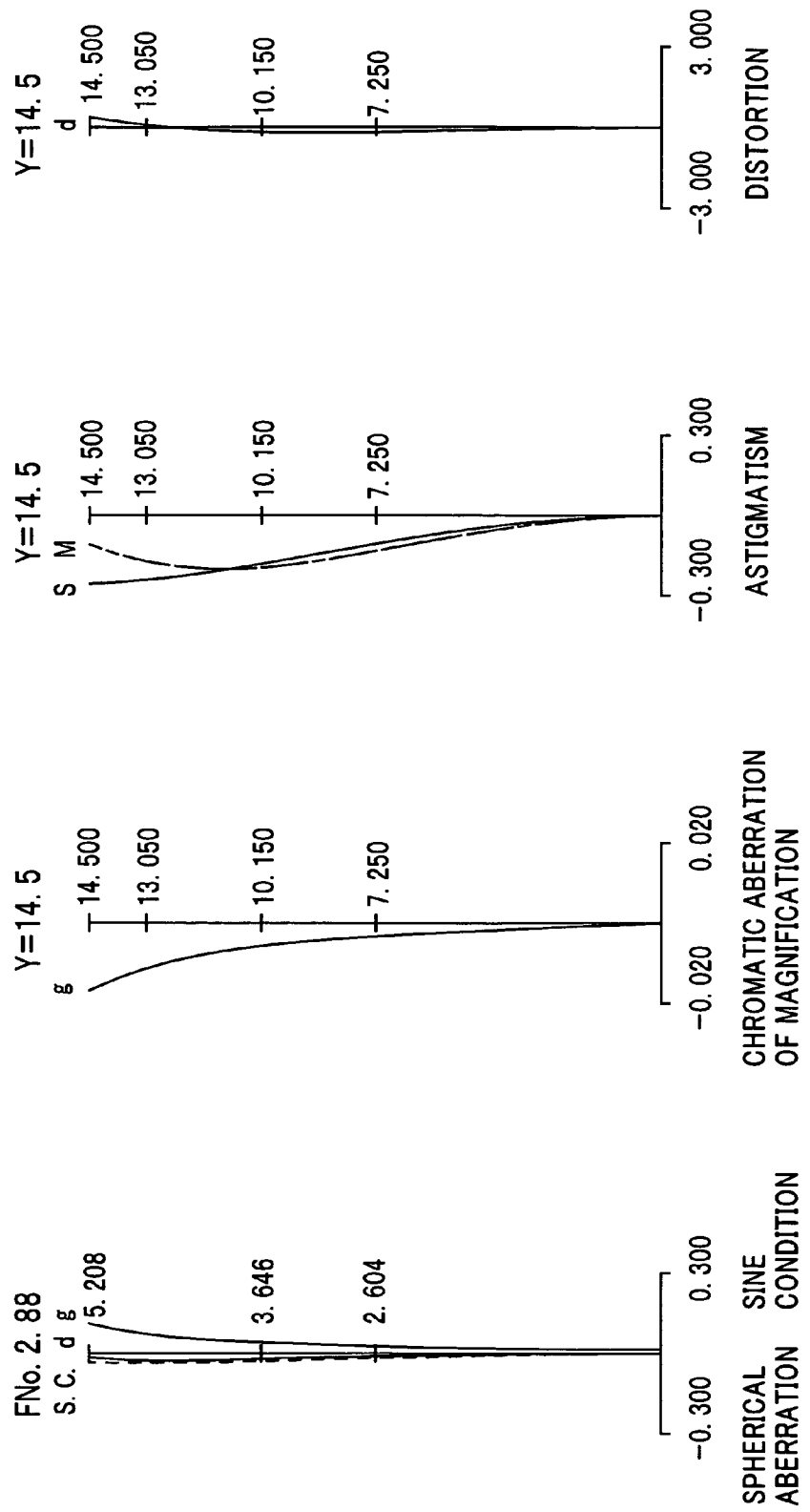
FIG. 4 is a diagram illustrating spherical aberration, sine conditions, chromatic aberration of magnification, astigmatism, and aberration of distortion caused in the exemplary large-aperture zoom lens in FIG. 1 at the intermediate zooming range.
Figure 5:
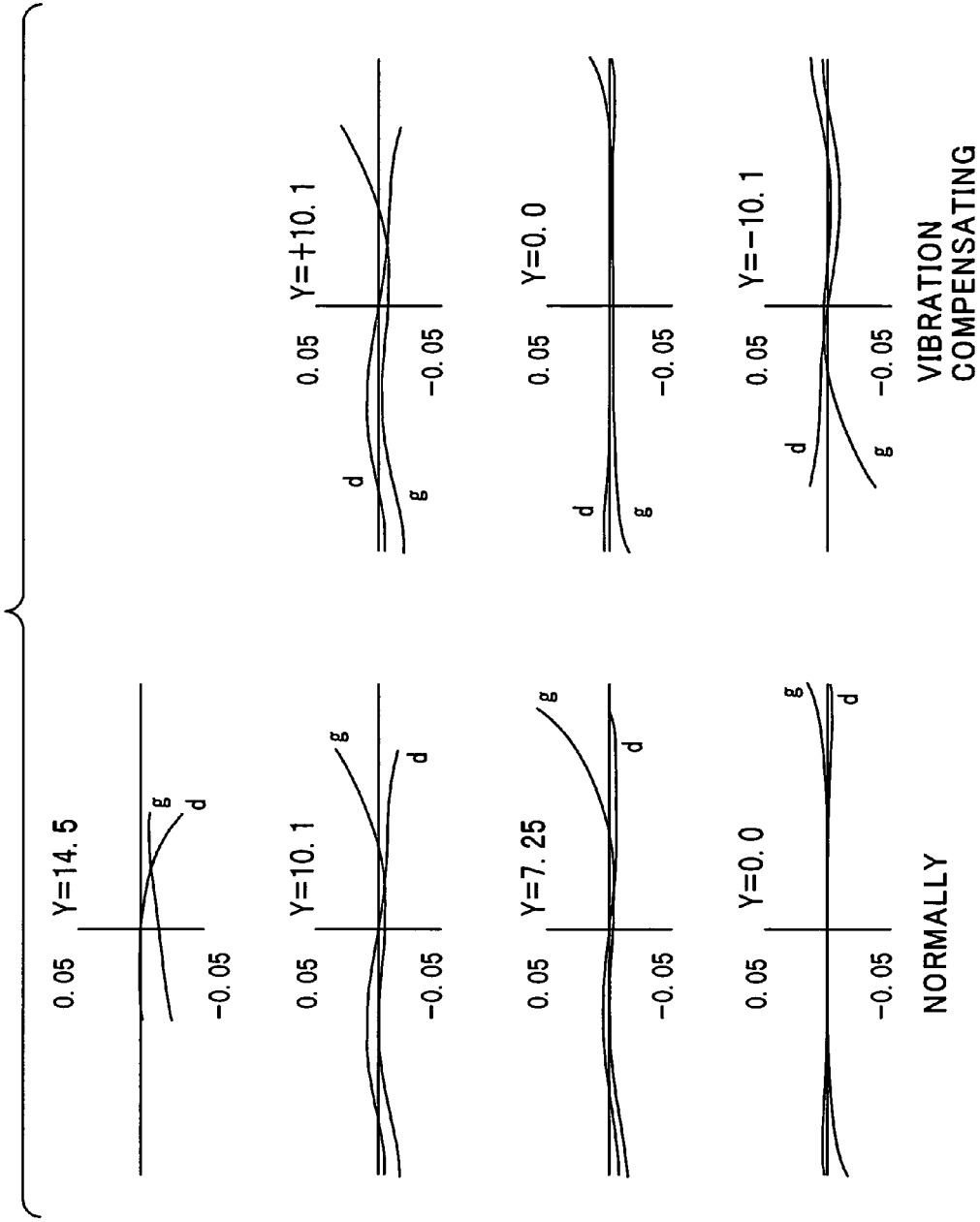
FIG. 5 is a diagram illustrating comatic aberration caused in the exemplary large-aperture zoom lens in FIG. 1 at the intermediate zooming range, set in the normal mode and the anti-vibration mode, respectively.
Figure 6:
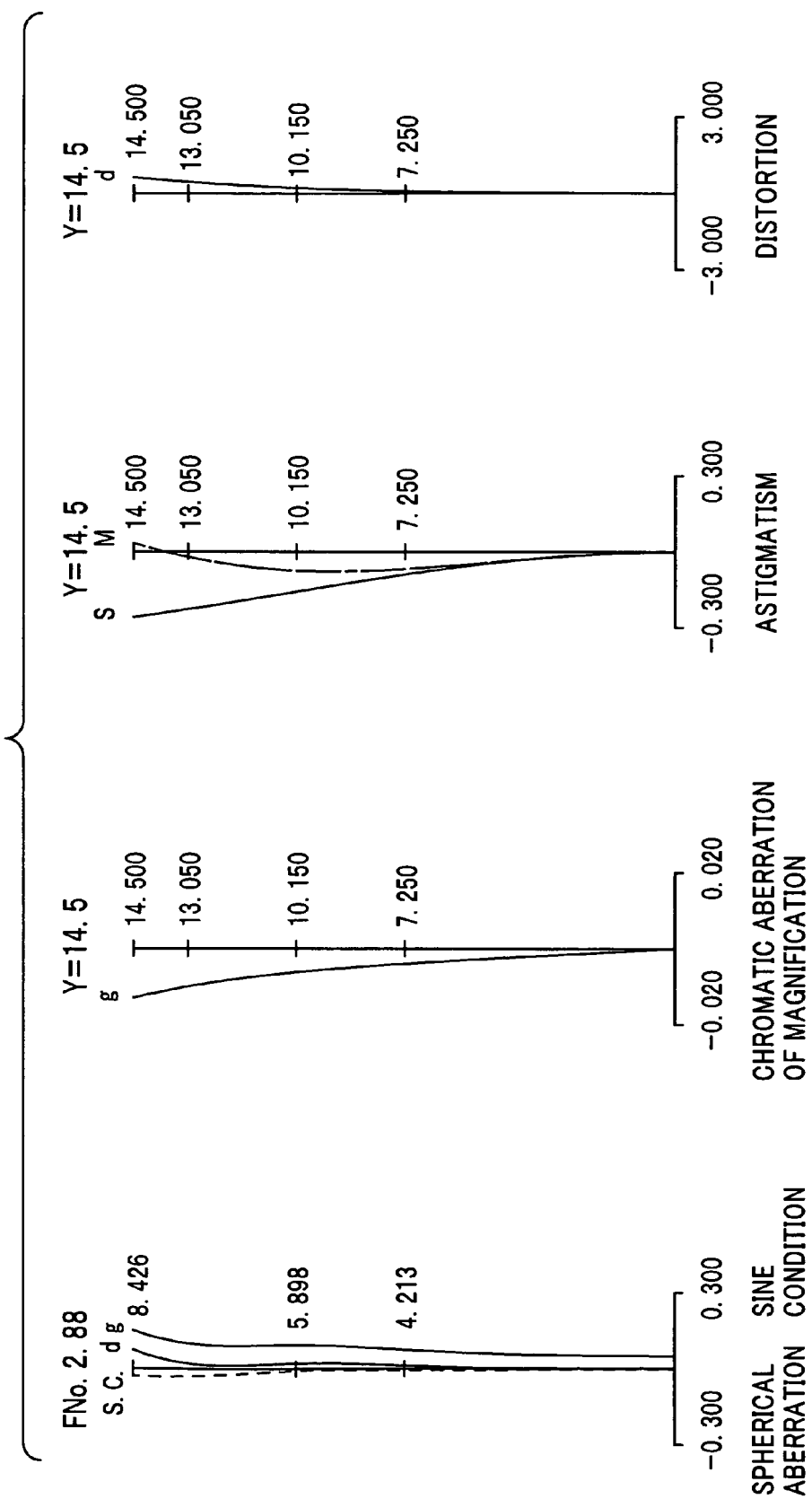
FIG. 6 is a diagram illustrating spherical aberration, sine conditions, chromatic aberration of magnification, astigmatism, and aberration of distortion caused in the exemplary large-aperture zoom lens in FIG. 1 at the telephoto end.
Figure 7:
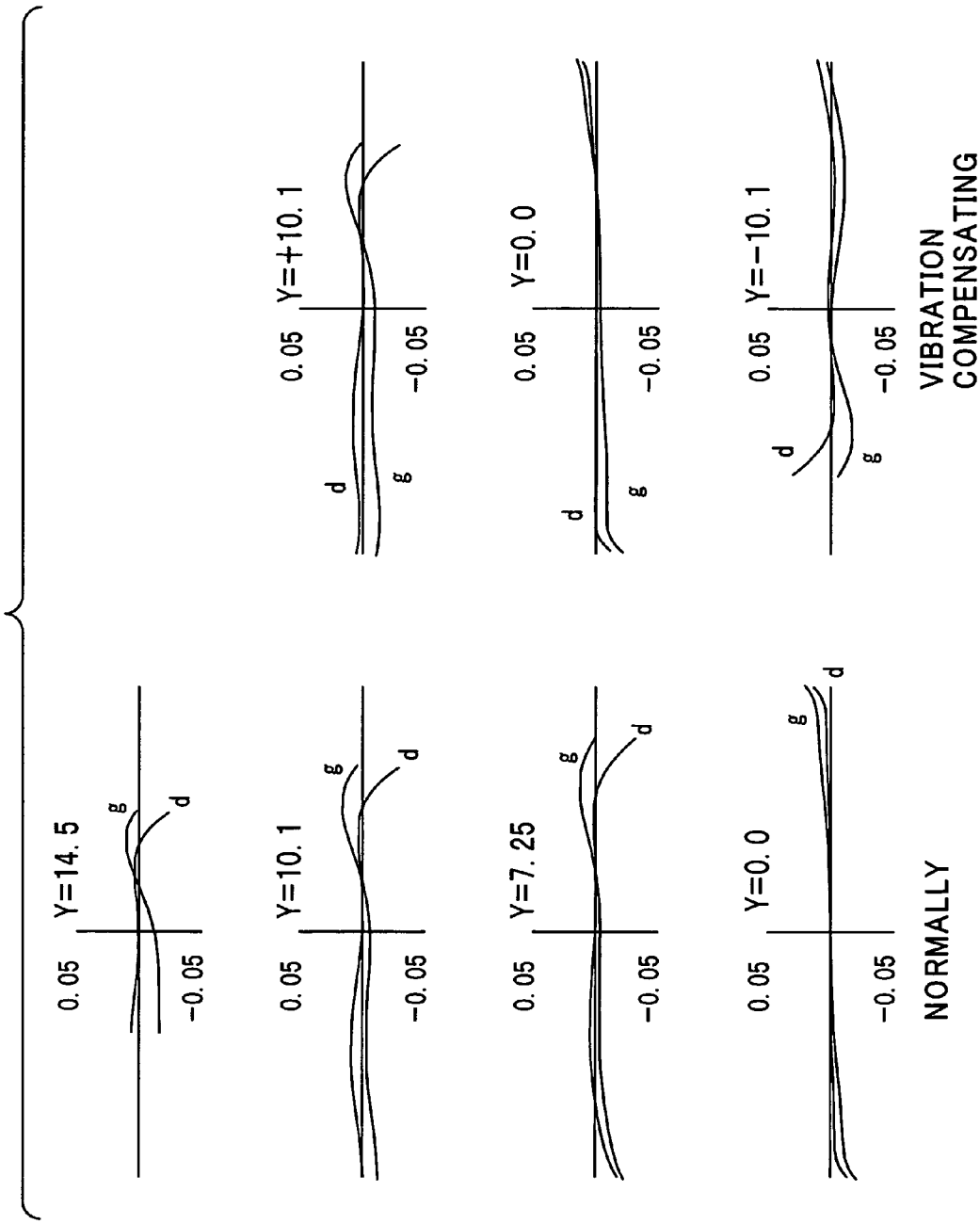
FIG. 7 is a diagram illustrating comatic aberration caused in the exemplary large-aperture zoom lens in FIG. 1 at the telephoto end, set in the normal mode and the anti-vibration mode, respectively.
Figure 8:
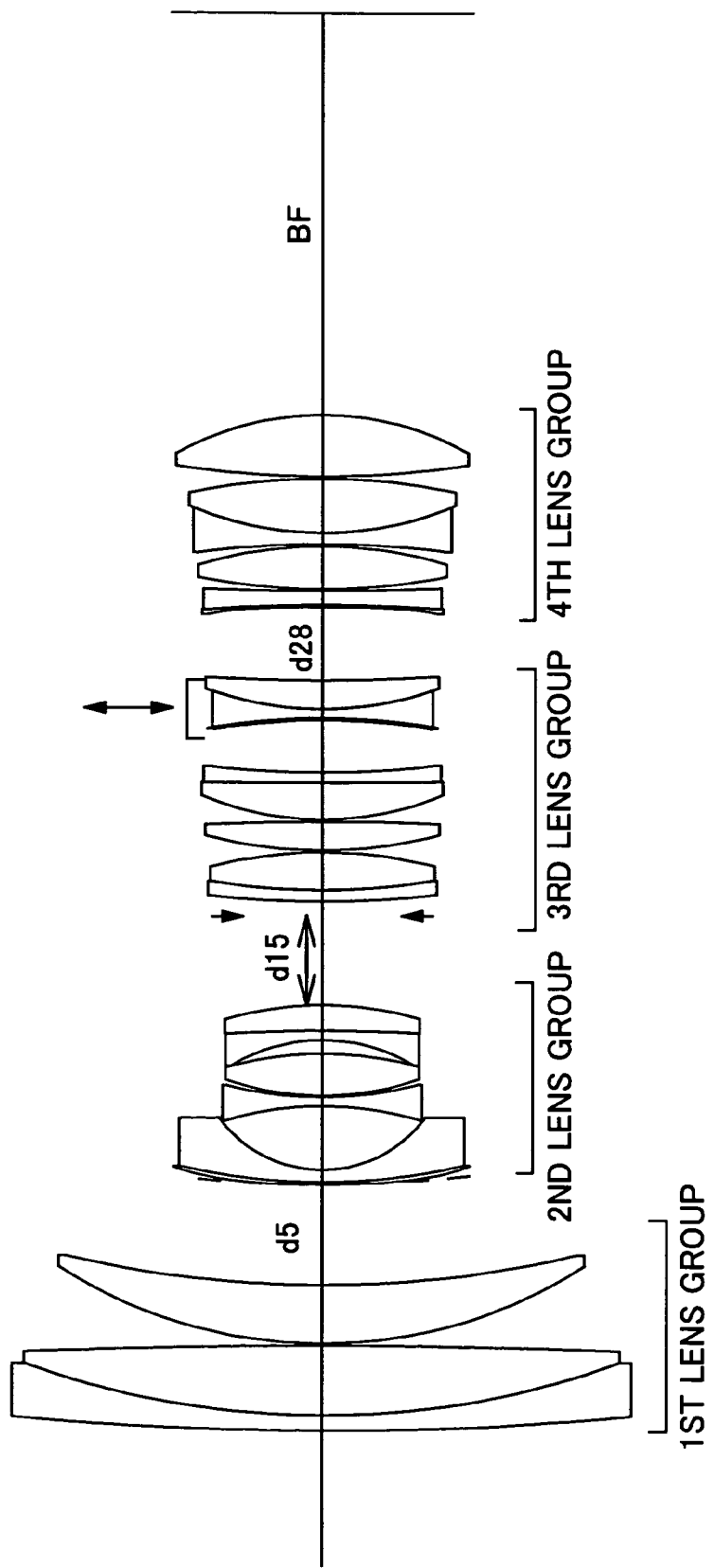
FIG. 8 is a diagram illustrating an optical configuration of another or second embodiment of the large-aperture zoom lens.
Figure 9:
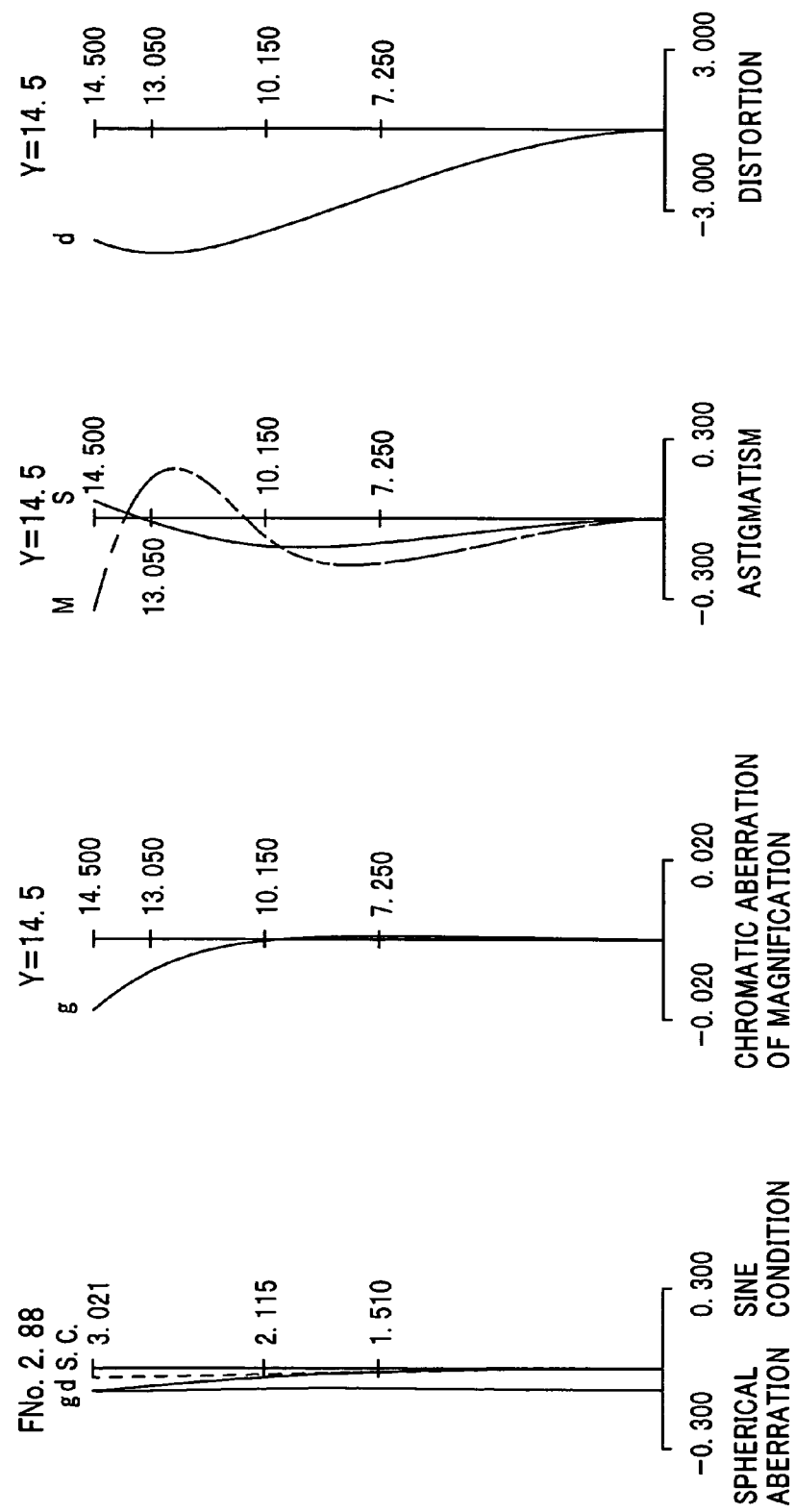
FIG. 9 is a diagram illustrating spherical aberration, sine conditions, chromatic aberration of magnification, astigmatism, and aberration of distortion caused in the large-aperture zoom lens in FIG. 8 at the wide-angle end.
Figure 10:
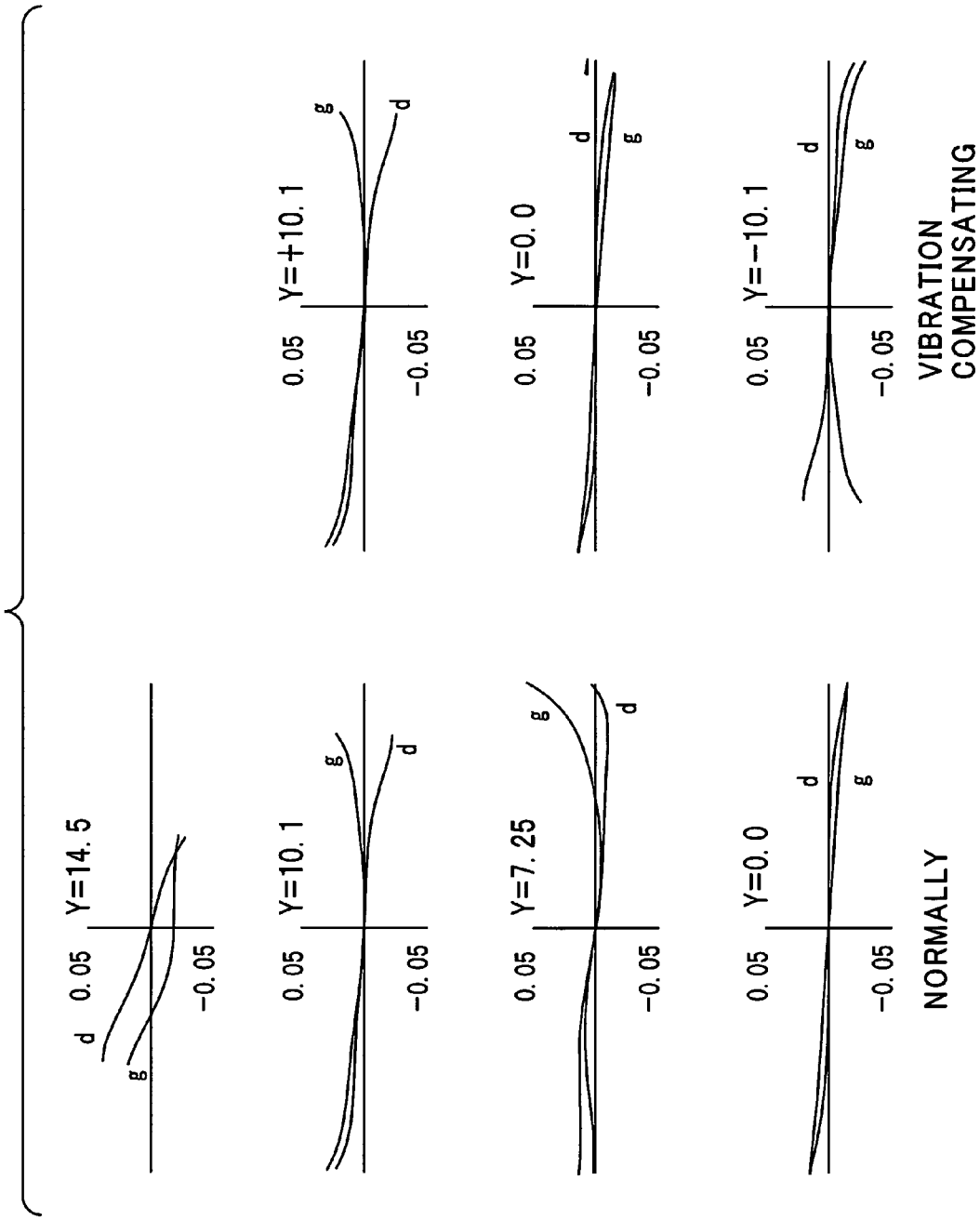
FIG. 10 is a diagram illustrating comatic aberration caused in the exemplary large-aperture zoom lens in FIG. 8 at the wide-angle end, set in the normal mode and the anti-vibration mode, respectively.
Figure 11:
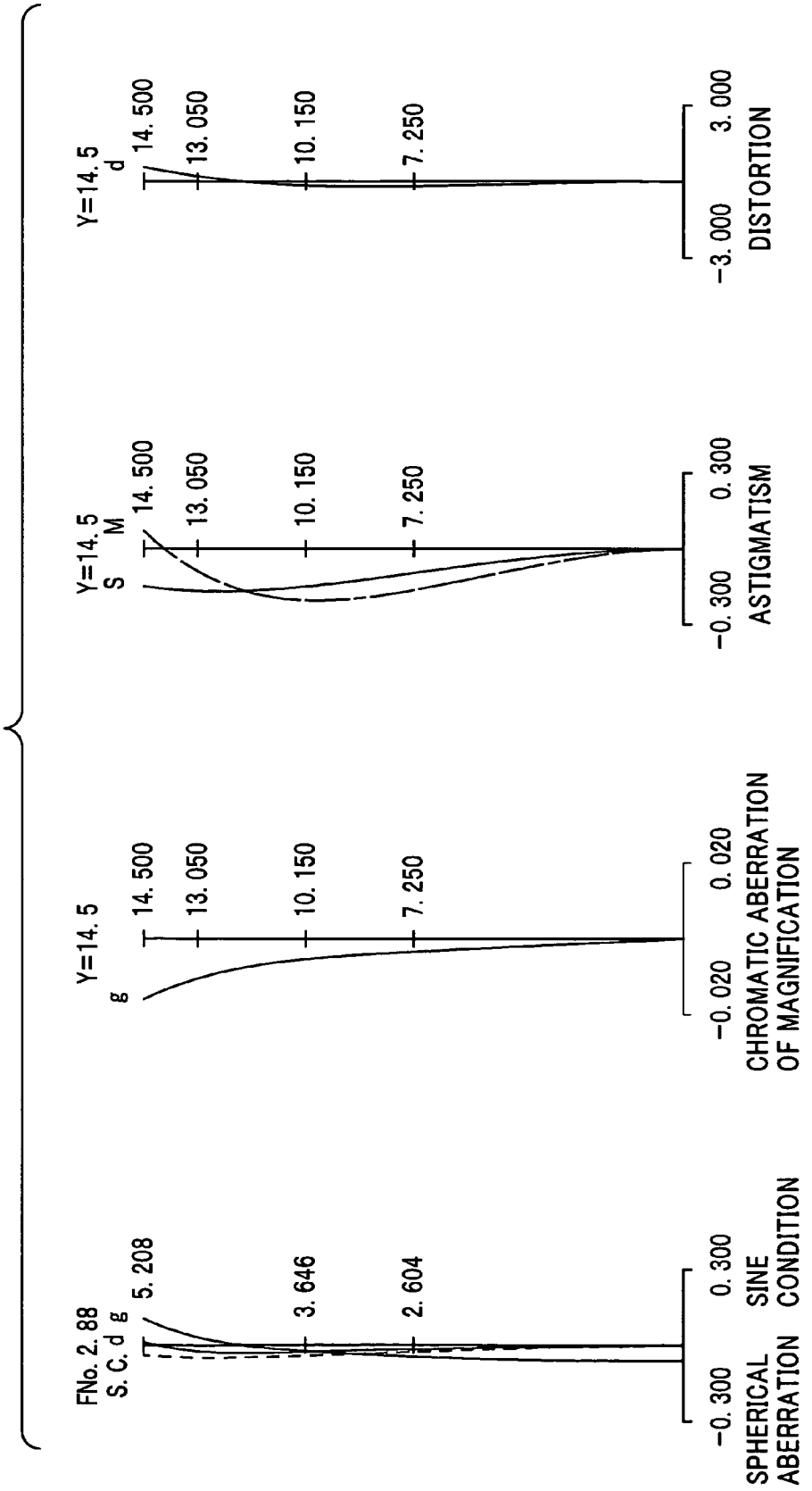
FIG. 11 is a diagram illustrating spherical aberration, sine conditions, chromatic aberration of magnification, astigmatism, and aberration of distortion caused in the exemplary large-aperture zoom lens in FIG. 8 at the intermediate zooming range.
Figure 12:
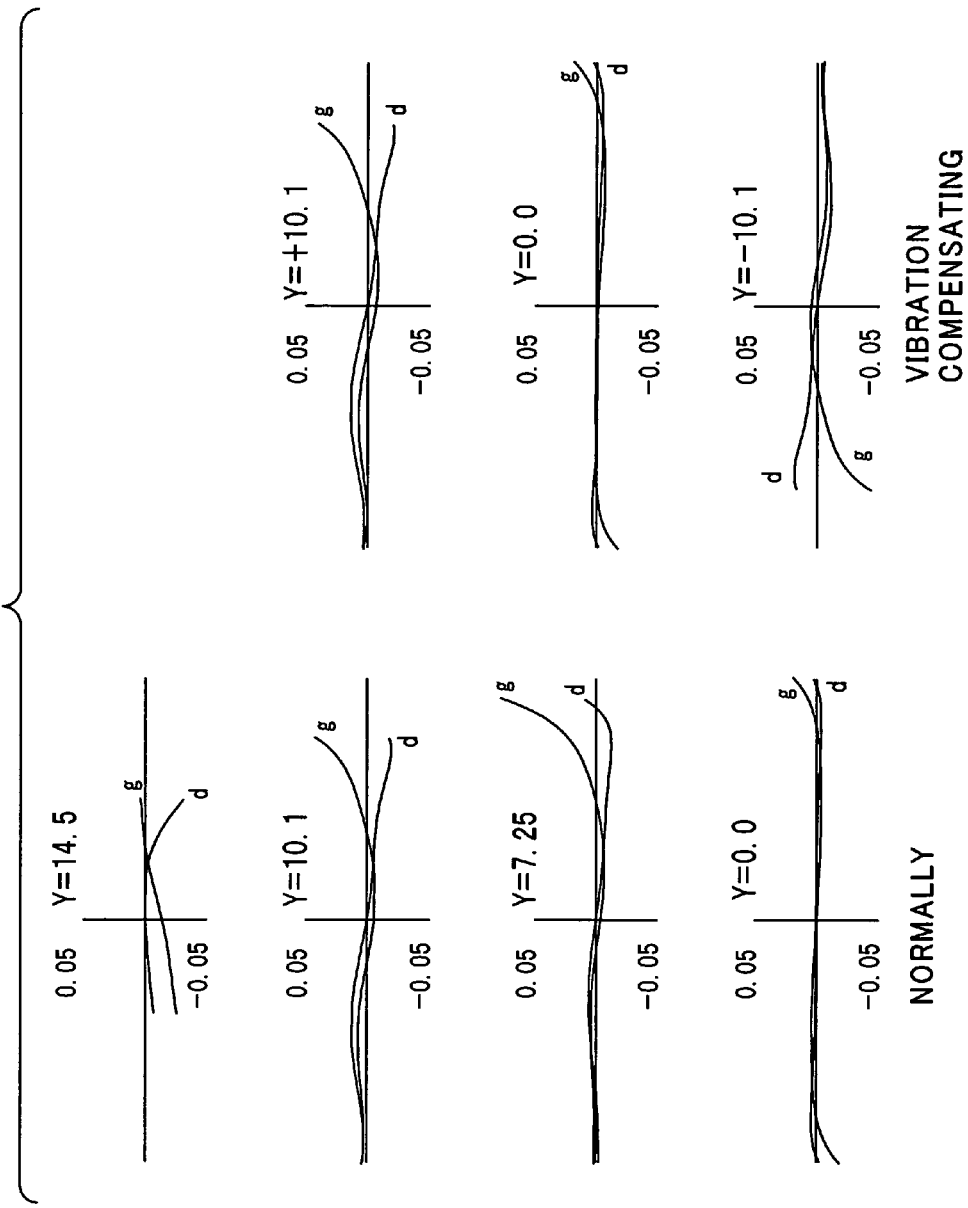
FIG. 12 is a diagram illustrating comatic aberration caused in the exemplary large-aperture zoom lens in FIG. 8 at the intermediate zooming range, set in the normal mode and the anti-vibration mode, respectively.
Figure 13:
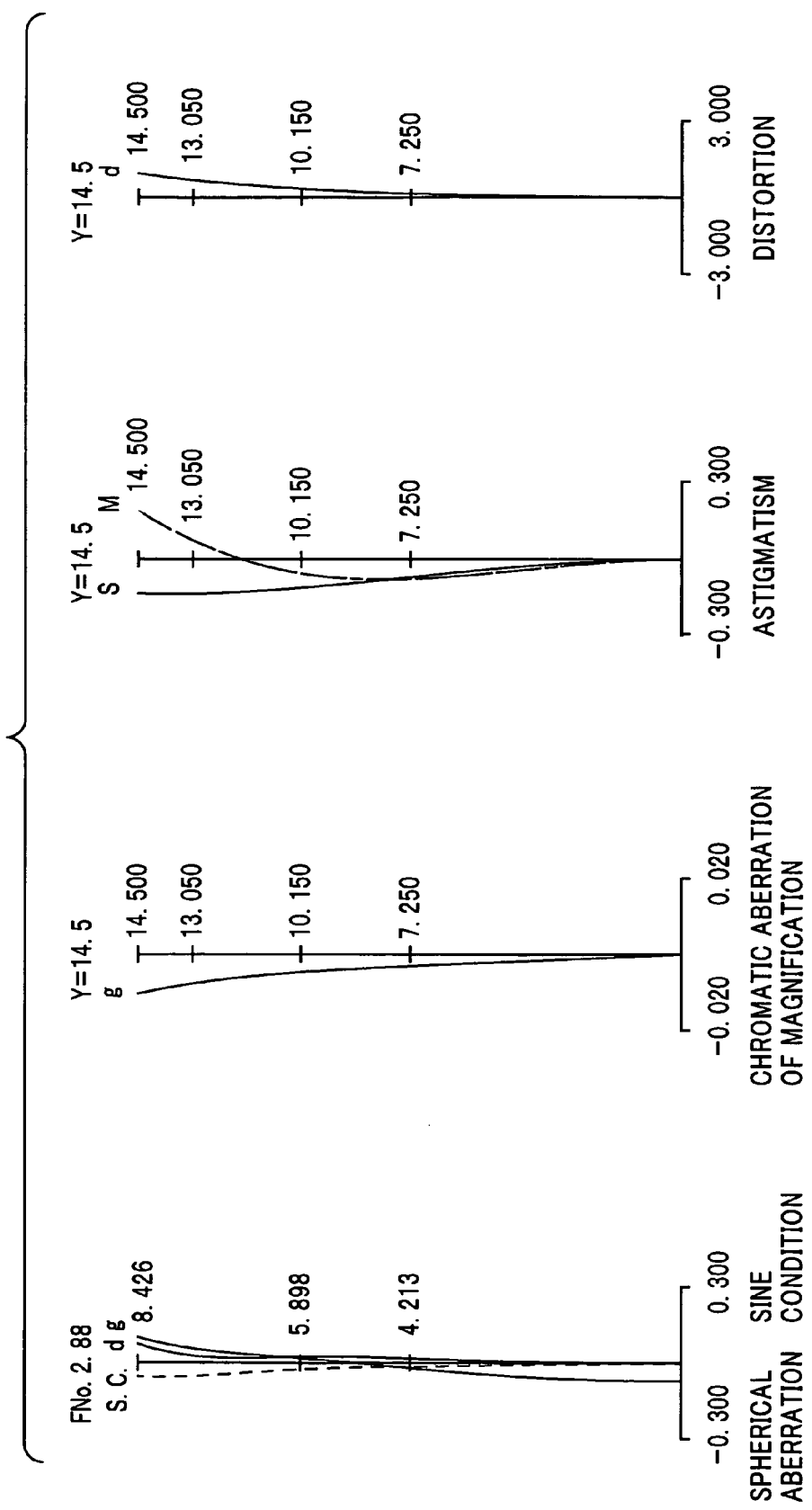
FIG. 13 is a diagram illustrating spherical aberration, sine conditions, chromatic aberration of magnification, astigmatism, and aberration of distortion caused in the exemplary large-aperture zoom lens in FIG. 8 at the telephoto end.
Figure 14:
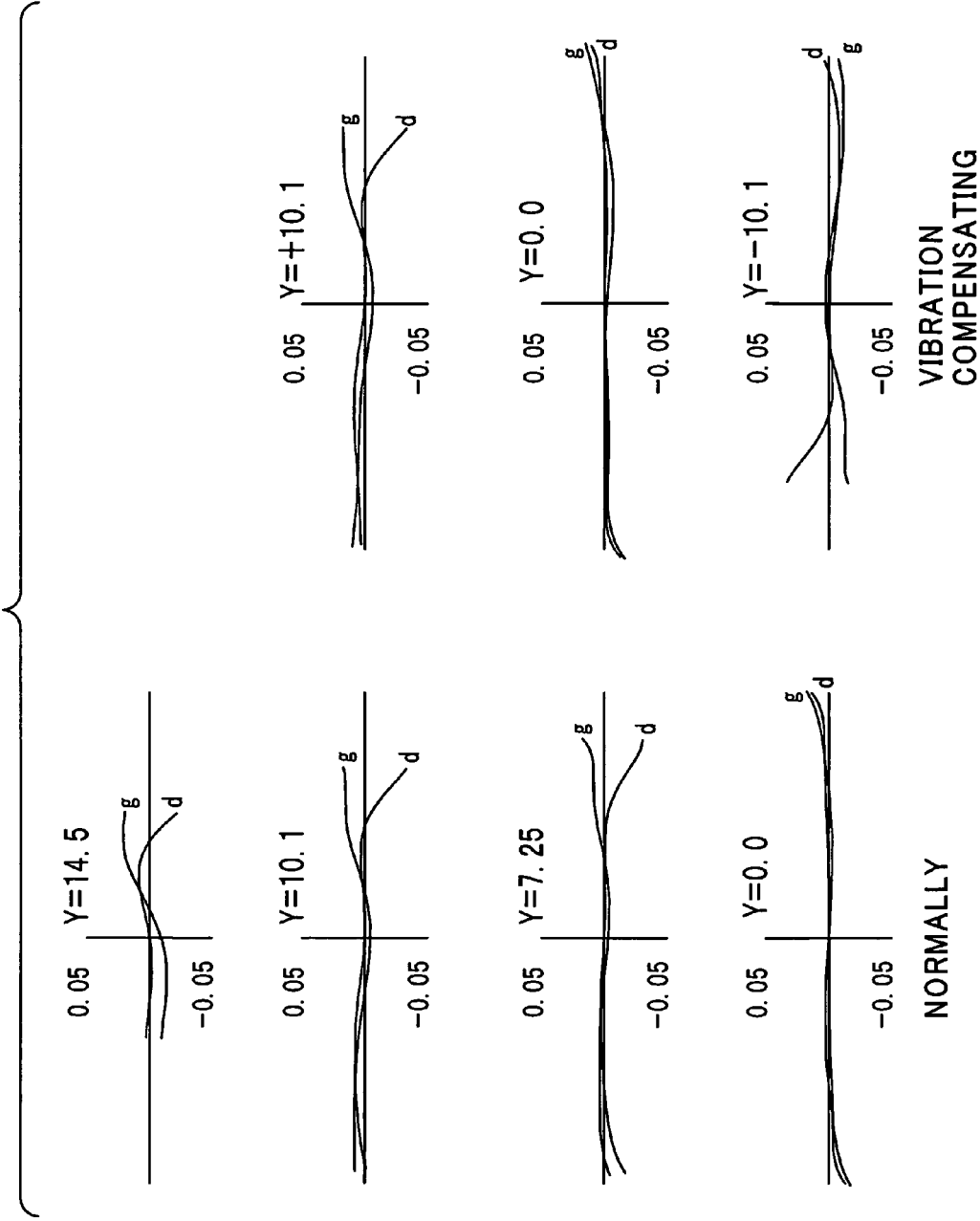
FIG. 14 is a diagram illustrating comatic aberration caused in the exemplary large-aperture zoom lens in FIG. 8 at the telephoto end, set in the normal mode and the anti-vibration mode, respectively.

A large-aperture zoom lens according to the present invention will now be described in the context of its preferred but non-limited embodiments along with various aberrations caused therein.

Embodiment 1

$f=17.4 \sim 30.00 \sim 48.54$ (The value varied on field angle from wide-angle end to the Intermediate zooming range, and further to the telephoto end)

Zoom Ratio=2.789

Fno(Aperture Ratio)=2.88~2.88~2.88

2ω(FieldAngle)=81.2°~51.4°~33.1°

Image Height Y=14.5 mm

Various data on the lens optics are given as follows where NO is number of each lens surface, R is radius of curvature (in millimeters or mm) of each lens surface, D is thickness or distance (in millimeters or mm), Nd is refractive power of the d-line, and vd is Abbe dispersion value.

| NO | R | D | Nd | vd |
|---|---|---|---|---|
| 1 | 314.7191 | 1.5000 | 1.84666 | 23.78 |
| 2 | 75.3417 | 7.1000 | 1.72000 | 50.25 |
| 3 | −1069.8073 | 0.2000 | 1.00000 | |

-continued

| NO | R | D | Nd | vd |
|---|---|---|---|---|
| 4 | 44.7880 | 5.8000 | 1.77250 | 49.60 |
| 5 | 101.0322 | d5 | 1.00000 | |
| 6 (ASPH) | 125.0000 | 0.2000 | 1.51460 | 49.96 |
| 7 | 53.5957 | 1.2000 | 1.77250 | 49.60 |
| 8 | 12.5220 | 6.1724 | 1.00000 | |
| 9 | −34.2597 | 0.9000 | 1.83481 | 42.72 |
| 10 | 39.6290 | 0.4730 | 1.00000 | |
| 11 | 30.1093 | 4.1000 | 1.71736 | 29.51 |
| 12 | −31.4737 | 1.3071 | 1.00000 | |
| 13 | −16.6615 | 0.9000 | 1.77250 | 49.60 |
| 14 | 111.5837 | 2.6000 | 1.75520 | 27.51 |
| 15 | −37.8930 | d15 | 1.00000 | |
| 16 Aperture Stop | ∞ | 1.0000 | 1.00000 | |
| 17 | 88.1852 | 0.9000 | 1.88300 | 40.78 |
| 18 | 53.5773 | 3.7000 | 1.48749 | 70.21 |
| 19 | −42.0808 | 0.2000 | 1.00000 | |
| 20 | 46.3263 | 2.8000 | 1.48749 | 70.21 |
| 21 | −160.1946 | 0.2000 | 1.00000 | |
| 22 | 32.7941 | 3.7000 | 1.49700 | 81.61 |
| 23 | −773.6488 | 1.0000 | 2.00069 | 25.46 |
| 24 | 217.8296 | 5.6000 | 1.00000 | |
| 25 (ASPH) | −54.3264 | 0.2000 | 1.53610 | 41.20 |
| 26 | −54.3264 | 0.9000 | 1.77250 | 49.60 |
| 27 | 34.6964 | 2.7000 | 1.62588 | 35.70 |
| 28 | −2164.0715 | d28 | 1.00000 | |
| 29 (ASPH) | −500.0000 | 0.2000 | 1.51460 | 49.96 |
| 30 | −155.0000 | 1.4000 | 1.83400 | 37.17 |
| 31 | 495.7343 | 0.6173 | 1.00000 | |
| 32 | 96.7032 | 4.4000 | 1.48749 | 70.21 |
| 33 | −33.3304 | 0.2000 | 1.00000 | |
| 34 | −69.1331 | 1.1000 | 1.83400 | 37.17 |
| 35 | 39.7498 | 4.5000 | 1.49700 | 81.61 |
| 36 | −62.9332 | 0.2000 | 1.00000 | |
| 37 | 101.2103 | 6.5131 | 1.48749 | 70.21 |
| 38 | −27.0721 | BF | 1.00000 | |

Varied Distance Resulted from Altering Lens Power

| F (Focal Length) | 17.40 | 30.00 | 48.54 |
|---|---|---|---|
| d5 | 2.558 | 15.276 | 26.378 |
| d15 | 16.041 | 6.605 | 1.400 |
| d28 | 8.031 | 3.627 | 2.000 |
| BF (Back Focus) | 38.994 | 52.242 | 63.847 |

Overall Length of the Lens for Varied Focal Length (from Front End Surface of the Lens to Image Plane)

| F (Focal Length) | 17.40 | 30.00 | 48.54 |
|---|---|---|---|
| OAL (Overall Length) | 140.107 | 152.233 | 168.456 |

Focal Length for Each Lens Group

| 1st Lens Group | 85.546 |
|---|---|
| 2nd Lens Group | −12.159 |
| 3rd Lens Group | 37.908 |
| 4th Lens Group | 39.895 |

ASPH denotes an aspherical surface and is given by an expression as in the formula (4) as follows:

$$x = \frac{H^2/r}{1+\sqrt{1-A(H/r)^2}} + A_4 H^4 + A_6 H^6 + A_8 H^8 + A_{10} H^{10} \quad (4)$$

Coefficients of the aspherical surfaces in Embodiment 1 are given as follows:

r6
  A=1.0
  A4=3.13083E-05
  A6=-5.51732E-08
  A8=6.17262E-11
  A10=5.90192E-13 r25
  A=1.0
  A4=6.04759E-06
  A6=1.11910E-08
  A8=4.34371E-11
  A10=-5.09054E-13 r29
  A=1.0
  A4=-3.06410E-05
  A6=-2.01122E-08
  A8=-3.99823E-11
  A10=6.50959E-14

Values defined in the conditional formula are given for Embodiment 1 as follows:

$f3/fw=2.1786$     Formula (1)

$f4/fw=2.2928$     Formula (2)

$BFW/fw=2.2410$     Formula (3)

Embodiment 2

$f=17.4\sim30.00\sim48.54$

Zoom Ratio=2.789

Fno(Aperture Ratio)=2.88~2.88~2.88

2ω(FieldAngle)=82.0°~51.3°~33.0°

Image Height Y=14.5 mm

Various data on the lens optics are given as follows where NO is number of each lens surface, R is radius of curvature (in millimeters or mm) of each lens surface, D is thickness or distance (in millimeters or mm), Nd is refractive power of the d-line, and vd is Abbe dispersion value.

| NO | R | D | Nd | vd |
|---|---|---|---|---|
| 1 | 310.0000 | 1.5000 | 1.84666 | 23.78 |
| 2 | 81.9463 | 6.8000 | 1.69680 | 55.53 |
| 3 | -729.5537 | 0.2000 | 1.00000 | |
| 4 | 45.8668 | 5.7000 | 1.77250 | 49.60 |
| 5 | 105.0000 | d5 | 1.00000 | |
| 6 (ASPH) | 125.0000 | 0.2000 | 1.51460 | 49.96 |
| 7 | 58.0000 | 1.2000 | 1.77250 | 49.60 |
| 8 | 12.1271 | 6.2243 | 1.00000 | |
| 9 | -32.5135 | 0.9000 | 1.83481 | 42.72 |
| 10 | 36.6271 | 0.1098 | 1.00000 | |
| 11 | 27.6836 | 4.1000 | 1.72825 | 28.46 |

-continued

| NO | R | D | Nd | vd |
|---|---|---|---|---|
| 12 | -34.2783 | 1.3216 | 1.00000 | |
| 13 | -16.8566 | 0.9000 | 1.77250 | 49.60 |
| 14 | -176.2560 | 2.5000 | 1.80518 | 25.43 |
| 15 | -33.7043 | d15 | 1.00000 | |
| 16 Aperture Stop | ∞ | 1.4000 | 1.00000 | |
| 17 | 91.1557 | 1.1000 | 1.80610 | 33.27 |
| 18 | 61.3000 | 3.7000 | 1.48749 | 70.21 |
| 19 | -43.3377 | 0.2000 | 1.00000 | |
| 20 | 43.1463 | 2.8000 | 1.48749 | 70.21 |
| 21 | -268.5414 | 0.2000 | 1.00000 | |
| 22 | 29.1553 | 3.6000 | 1.49700 | 81.61 |
| 23 | 1110.6599 | 1.0000 | 1.80518 | 25.43 |
| 24 | 91.1828 | 5.1000 | 1.00000 | |
| 25 (ASPH) | -64.1187 | 0.2000 | 1.53610 | 41.20 |
| 26 | -64.1187 | 0.9000 | 1.77250 | 49.60 |
| 27 | 32.1182 | 2.8000 | 1.69895 | 30.10 |
| 28 | 188.2583 | d28 | 1.00000 | |
| 29 (ASPH) | -350.0000 | 0.2000 | 1.51460 | 49.96 |
| 30 | -155.0000 | 1.4000 | 1.78590 | 44.19 |
| 31 | 316.5406 | 0.1500 | 1.00000 | |
| 32 | 60.4575 | 4.2000 | 1.48749 | 70.21 |
| 33 | -40.7060 | 0.2000 | 1.00000 | |
| 34 | -92.7227 | 1.1000 | 1.83400 | 37.17 |
| 35 | 31.9956 | 5.3000 | 1.49700 | 81.61 |
| 36 | -60.6709 | 0.2000 | 1.00000 | |
| 37 | 91.2327 | 6.0000 | 1.48749 | 70.21 |
| 38 | -28.1709 | BF | 1.00000 | |

Varied Distance Resulted from Altering Lens Power

| F (Focal Length) | 17.40 | 30.00 | 48.54 |
|---|---|---|---|
| d5 | 2.589 | 15.374 | 26.554 |
| d15 | 15.958 | 6.627 | 1.400 |
| d28 | 7.162 | 3.467 | 2.000 |
| BF (Back Focus) | 38.997 | 51.770 | 63.022 |

Overall Length of the Lens for Varied Focal Length (from Front End Surface of the Lens to Image Plane)

| F (Focal Length) | 17.40 | 30.00 | 48.54 |
|---|---|---|---|
| OAL (Overall Length) | 138.111 | 150.643 | 166.382 |

Focal Length for Each Lens Group

| 1st Lens Group | 85.310 |
|---|---|
| 2nd Lens Group | -12.350 |
| 3rd Lens Group | 38.804 |
| 4th Lens Group | 39.313 |

Coefficients of the aspherical surfaces in Embodiment 2 are given as follows:

Coefficients of Aspherical Surfaces r6
  A=1.0
  A4=2.89346E-05
  A6=-4.50356E-08
  A8=-8.58965E-11
  A10=9.13287E-13 r25
 A=1.0
 A4=2.42427E-06
 A6=5.40848E-08
 A8=−3.02979E-10
 A10=5.54209E-13 r29
 A=1.0
 A4=−2.65056E-05
 A6=−5.42702E-08
 A8=2.15779E-10
 A10=−6.25333E-13

Values defined in the conditional formula are given for Embodiment 2 as follows:

$$f3/fw = 2.2301 \quad \text{Formula (1)}$$

$$f4/fw = 2.2594 \quad \text{Formula (2)}$$

$$BFW/fw = 2.2412 \quad \text{Formula (3)}$$

The values of the conditional formulae (1), (2) and (3) for various prior art embodiments disclosed in the aforementioned patent documents are given as follows:

| Reference# (Official Gazette Num) | Embodiment# | f3/fw | f4/fw | bfw/fw |
|---|---|---|---|---|
| Patent Document 1 (2007-133138) | 1 | 2.3351 | 2.0861 | 2.2389 |
|  | 2 | 2.4556 | 2.1525 | 2.2936 |
| Patent Document 2 (2007-93773) | 1 | 4.2439 | 1.4061 | 2.0061 |
|  | 2 | 2.3669 | 1.9682 | 1.9084 |
|  | 3 | 3.5202 | 1.6952 | 2.0577 |
|  | 4 | 3.6804 | 1.4957 | 2.0105 |
| Patent Document 3 (2006-284763) | 1 | 2.9258 | 2.1404 | 2.0601 |
|  | 2 | 2.6599 | 2.3278 | 2.0563 |
|  | 3 | 2.7436 | 2.6134 | 2.1311 |
|  | 4 | 1.8411 | 2.0295 | 1.9404 |
| Patent Document 4 (2006-106191) | 1 | 2.9258 | 2.1404 | 2.0601 |
|  | 2 | 2.6596 | 2.3278 | 2.0564 |
|  | 3 | 2.7436 | 2.6134 | 2.1311 |
|  | 4 | 1.8411 | 2.0295 | 1.9404 |
|  | 5 | 2.8458 | 2.3685 | 2.1428 |
|  | 6 | 2.5812 | 2.5466 | 2.1428 |
| Patent Document 5 (2006-234892) | 1 | 1.2980 | −1.6707 | 2.0288 |
|  | 2 | 1.2480 | −1.8544 | 2.0286 |
|  | 3 | 1.2349 | −1.8382 | 2.0286 |

What is claimed is:

1. In a large-aperture zoom lens that has four of groups of lens pieces, including the leading or foremost 1st lens group of positive refractivity, the succeeding 2nd lens group of negative refractivity, the 3rd lens group of positive refractivity, and the trailing 4th lens group of positive refractivity, as the zoom lens varies power from the wide-angle end to the telephoto end, the 1st and 2nd lens groups split farther away from each other, the 2nd and 3rd lens groups come closer to each other, and the 3rd and 4th lens groups come closer to each other;

the 3rd lens group includes the leading subset of the lens pieces of positive refractive power located closer to an object and the trailing subset of negative refractive power, and in order to compensate for tremors of user's hand(s) and vibrations of a camera and adjust an image formed, the trailing subset of the 3rd lens group alone are displaced in directions perpendicular to the optical axis; and the 4th lens group has its foremost lens piece shaped in concave lens on a surface closer to the object.

2. The large-aperture zoom lens according to claim 1, meeting requirements as expressed in the following conditional formula:

$$1.6 \leq BFW/fw \leq 2.4 \quad (3)$$

where BFW is a back focus at the wide-angle end.

3. In a large-aperture zoom lens that has four of groups of lens pieces, including the leading or foremost 1st lens group of positive refractivity, the succeeding 2nd lens group of negative refractivity, the 3rd lens group of positive refractivity, and the trailing 4th lens group of positive refractivity, as the zoom lens varies power from the wide-angle end to the telephoto end, the 1st and 2nd lens groups split farther away from each other, the 2nd and 3rd lens groups come closer to each other, and the 3rd and 4th lens groups come closer to each other;

the 3rd lens group includes the leading subset of the lens pieces of positive refractive power located closer to an object and the trailing subset of negative refractive power, and in order to compensate for tremors of user's hand(s) and vibrations of a camera and adjust an image formed, the trailing subset of the 3rd lens group alone are displaced in directions perpendicular to the optical axis; and the large-aperture zoom lens meets requirements as expressed in the following conditional formula:

$$1.6 \leq f3/fw \leq 2.4 \quad (1)$$

$$2.0 \leq f4/fw \leq 2.4 \quad (2)$$

where fw is a focal length of the entire lens optics at the wide-angle end, f3 is the focal length of the 3rd lens group, and f4 is the focal length of the 4th lens group.

4. The large-aperture zoom lens according to claim 3, meeting requirements as expressed in the following conditional formula:

$$1.6 \leq BFW/fw \leq 2.4 \quad (3)$$

where BFW is a back focus at the wide-angle end.

5. In a large-aperture zoom lens that has four of groups of lens pieces, including the leading or foremost 1st lens group of positive refractivity, the succeeding 2nd lens group of negative refractivity, the 3rd lens group of positive refractivity, and the trailing 4th lens group of positive refractivity, as the zoom lens varies power from the wide-angle end to the telephoto end, the 1st and 2nd lens groups split farther away from each other, the 2nd and 3rd lens groups come closer to each other, and the 3rd and 4th lens groups come closer to each other;

the 3rd lens group includes the leading subset of the lens pieces of positive refractive power located closer to an object and the trailing subset of negative refractive power, and in order to compensate for tremors of user's hand(s) and vibrations of a camera and adjust an image formed, the trailing subset of the 3rd lens group alone are displaced in directions perpendicular to the optical axis;

the 4th lens group has its foremost lens piece shaped in concave lens on a surface closer to the object; and the large-aperture zoom lens meets requirements as expressed in the conditional formula as follows:

$$2.0 \leq f4/fw \leq 2.4 \quad (2)$$

where fw is a focal length of the entire lens optics at the wide-angle end, and f4 is the focal length of the 4th lens group.

* * * * *